US011486406B2

(12) United States Patent
Gallinelli et al.

(10) Patent No.: US 11,486,406 B2
(45) Date of Patent: Nov. 1, 2022

(54) METHOD FOR HANDLING THE SHUTDOWN OF A TURBOMACHINE STRING IN A LIQUEFACTION PLANT OF A GASEOUS PRODUCT

(71) Applicant: NUOVO PIGNONE TECNOLOGIE S.R.L., Florence (IT)

(72) Inventors: Lorenzo Gallinelli, Florence (IT); Andrea Franchi, Florence (IT)

(73) Assignee: NUOVO PIGNONE TECNOLOGIE SRL, Florence (IT)

(*) Notice: Subject to any disclaimer, the term of this patent is extended or adjusted under 35 U.S.C. 154(b) by 618 days.

(21) Appl. No.: 15/736,163

(22) PCT Filed: Jun. 15, 2016

(86) PCT No.: PCT/EP2016/063720
§ 371 (c)(1),
(2) Date: Dec. 13, 2017

(87) PCT Pub. No.: WO2016/202842
PCT Pub. Date: Dec. 22, 2016

(65) Prior Publication Data
US 2018/0180053 A1 Jun. 28, 2018

(30) Foreign Application Priority Data
Jun. 17, 2015 (IT) .................. 102015000024649

(51) Int. Cl.
*F04D 27/00* (2006.01)
*F04D 25/16* (2006.01)
(Continued)

(52) U.S. Cl.
CPC ........... *F04D 27/004* (2013.01); *F04D 25/04* (2013.01); *F04D 25/06* (2013.01); *F04D 25/16* (2013.01);
(Continued)

(58) Field of Classification Search
CPC .......... F04D 13/04; F04D 13/06; F04D 13/12; F04D 13/14; F04D 25/04; F04D 25/06;
(Continued)

(56) References Cited

U.S. PATENT DOCUMENTS

| 5,752,378 A | 5/1998 | Mirsky et al. |
| 7,392,158 B2 * | 6/2008 | Hikawa ................... H02P 21/13 |
| | | 702/41 |

(Continued)

FOREIGN PATENT DOCUMENTS

| EP | 2 600 089 A1 | 6/2013 |
| RU | 1732734 A1 | 4/1994 |
| RU | 2168044 C2 | 5/2001 |

OTHER PUBLICATIONS

Wilkes, M., et al., "Large Capacity Lng Trains: Focus On Improving Plant Operability During the Design Stage," pp. 1-8 (2015).
(Continued)

*Primary Examiner* — Kenneth J Hansen
(74) *Attorney, Agent, or Firm* — Baker Hughes Patent Org

(57) ABSTRACT

A method for handling the shutdown of a turbomachine string installed in a plant for the liquefaction of a gaseous product comprising at least two turbomachine strings comprises the steps of detecting the shutdown of a first turbomachine string; promptly increasing the driving torque on a shaft of a second turbomachine string when the shutdown is detected; maintaining the driving torque increase on the shaft of the second turbomachine string until a preset speed of the motor driver is reached or a predetermined period of time expires.

13 Claims, 2 Drawing Sheets

(51) Int. Cl.
*F25J 1/00* (2006.01)
*F25J 1/02* (2006.01)
*F04D 27/02* (2006.01)
*F04D 25/04* (2006.01)
*F04D 25/06* (2006.01)

(52) U.S. Cl.
CPC ..... *F04D 27/0261* (2013.01); *F04D 27/0269* (2013.01); *F25J 1/0022* (2013.01); *F25J 1/0052* (2013.01); *F25J 1/0207* (2013.01); *F25J 1/029* (2013.01); *F25J 1/0283* (2013.01); *F25J 1/0284* (2013.01); *F25J 1/0294* (2013.01); *F25J 1/0298* (2013.01); *F25J 2280/10* (2013.01)

(58) Field of Classification Search
CPC .... F04D 25/16; F04D 27/004; F04D 27/0261; F04D 27/0269; F25J 1/0298; F25J 1/0207; F25J 1/0283; F25J 1/0284; F25J 1/0022; F25J 1/0052; F25J 1/029; F25J 1/0294; F25J 2280/10; F25J 2280/20; G05B 23/0218; G05B 23/0259; G05B 23/0283; G05B 23/0286; G05B 23/0289
See application file for complete search history.

(56) References Cited

U.S. PATENT DOCUMENTS

| | | | |
|---|---|---|---|
| 9,489,341 B1* | 11/2016 | Ly | G05B 23/0227 |
| 2003/0233836 A1* | 12/2003 | Tanimoto | F25B 49/005 62/175 |
| 2005/0247073 A1* | 11/2005 | Hikawa | H02P 29/40 62/228.1 |
| 2007/0289322 A1* | 12/2007 | Mathews | F24F 11/77 62/225 |
| 2009/0324382 A1* | 12/2009 | Schmitz | F04D 27/001 415/1 |
| 2012/0121376 A1* | 5/2012 | Huis In Het Veld | F04D 27/0207 415/1 |
| 2013/0119666 A1* | 5/2013 | Holt | F01D 15/10 290/52 |
| 2014/0111888 A1* | 4/2014 | Wise | F01D 21/02 361/23 |
| 2015/0047377 A1* | 2/2015 | Hamasaki | F25B 49/005 62/115 |

OTHER PUBLICATIONS

Italian Search Report and Written Opinion issued in connection with corresponding IT Application No. 102015000024649 dated Apr. 22, 2016.

International Search Report and Written Opinion issued in connection with corresponding PCT Application No. PCT/EP2016/063720 dated Aug. 16, 2016.

International Preliminary Report on Patentability issued in connection with corresponding PCT Application No. PCT/EP2016/063720 dated Dec. 28, 2017.

* cited by examiner

METHOD FOR HANDLING THE SHUTDOWN OF A TURBOMACHINE STRING IN A LIQUEFACTION PLANT OF A GASEOUS PRODUCT

FIELD OF INVENTION

The subject matter of the present disclosure relates to a method for handling the shutdown of a turbomachine string in a liquefaction plant of a gaseous product. In particular, the method discussed in the present disclosure relates to a liquefaction plant for producing liquefied natural gas (LNG).

BACKGROUND OF THE INVENTION

In the state of the art, the production of LNG is performed in a dedicated plant, in which the natural gas is progressively cooled during a multi-step refrigeration process. Indeed, the plant comprises several heat exchangers in which the natural gas transfers heat to a refrigerating fluid.

With more detail, the refrigerating fluid is circulated through its plumbing. A group of compressors attached to the same shaft are called a "string" in the technical field. A string also comprises one or more power unit. Typically, a string is powered by a turbine and, optionally, by an electrical motor driver. A plant comprises a variable number of strings, but normally there are at least two strings in each plant. In the following disclosure a plant is assumed to comprise two strings for ease of description, however no loss of generality is intended, since the same concepts can be readily extended to a plant with more than two strings.

SUMMARY

Whenever a strings shuts down for an unforeseen reason, all of the refrigerant flow that was shared between the strings will be handled by a single string only. This causes a sudden increase of the compressors absorbed power. If the driver cannot supply that much power, or it does supply it but at a reduced rate, the speed of the still active string may decrease towards the minimum gas turbine speed and potentially shutdown for under-speed. The risk of a potential shutdown is higher as the string is operating near its minimum operating speed. The shutdown of the still active string will completely halt the LNG production in the plant.

A first embodiment of the invention therefore relates to a method for handling the shutdown of a turbomachine string. The turbomachine string is installed in a plant for the liquefaction of a gaseous product which comprises at least two turbomachine strings. Each turbomachine string comprises at least a motor driver and at least a driven compressor and all motor drivers are driving the driven compressors before a shutdown event occurs. The method comprises the steps of detecting the shutdown of a first turbomachine string. A further step is promptly increasing the driving torque on a shaft of a second turbomachine string when a shutdown is detected. The driving torque increase is maintained until a preset speed of the motor driver is reached or a predetermined period of time expires.

A second embodiment also relates to a control unit for a motor driver of a turbomachine string. The control unit comprises a sensor module configured to detect the speed of a shaft of the turbomachine string. A torque setting module is operatively connected to the detection module and is configured for setting a torque of the motor driver. A detection module is configured for detecting the shutdown of another turbomachine string. In particular, the torque setting module is configured to promptly increase the driving torque on a shaft of the second turbomachine string when the shutdown is detected and to maintain the driving torque increase on the shaft of the second turbomachine string until a preset speed of the motor driver is reached or a predetermined period of time expires.

In an embodiment, it is possible to raise the speed of the string and of the motor driver before the overload from the shutdown of the other string is felt by the turbine. Therefore, as the motor driver anticipates its contribution to the torque of the still active string, the turbine powering it does not risk being overloaded.

BRIEF DESCRIPTION OF THE DRAWINGS

Further details and specific embodiments will refer to the attached drawings, in which.

DETAILED DESCRIPTION

Figure 1:
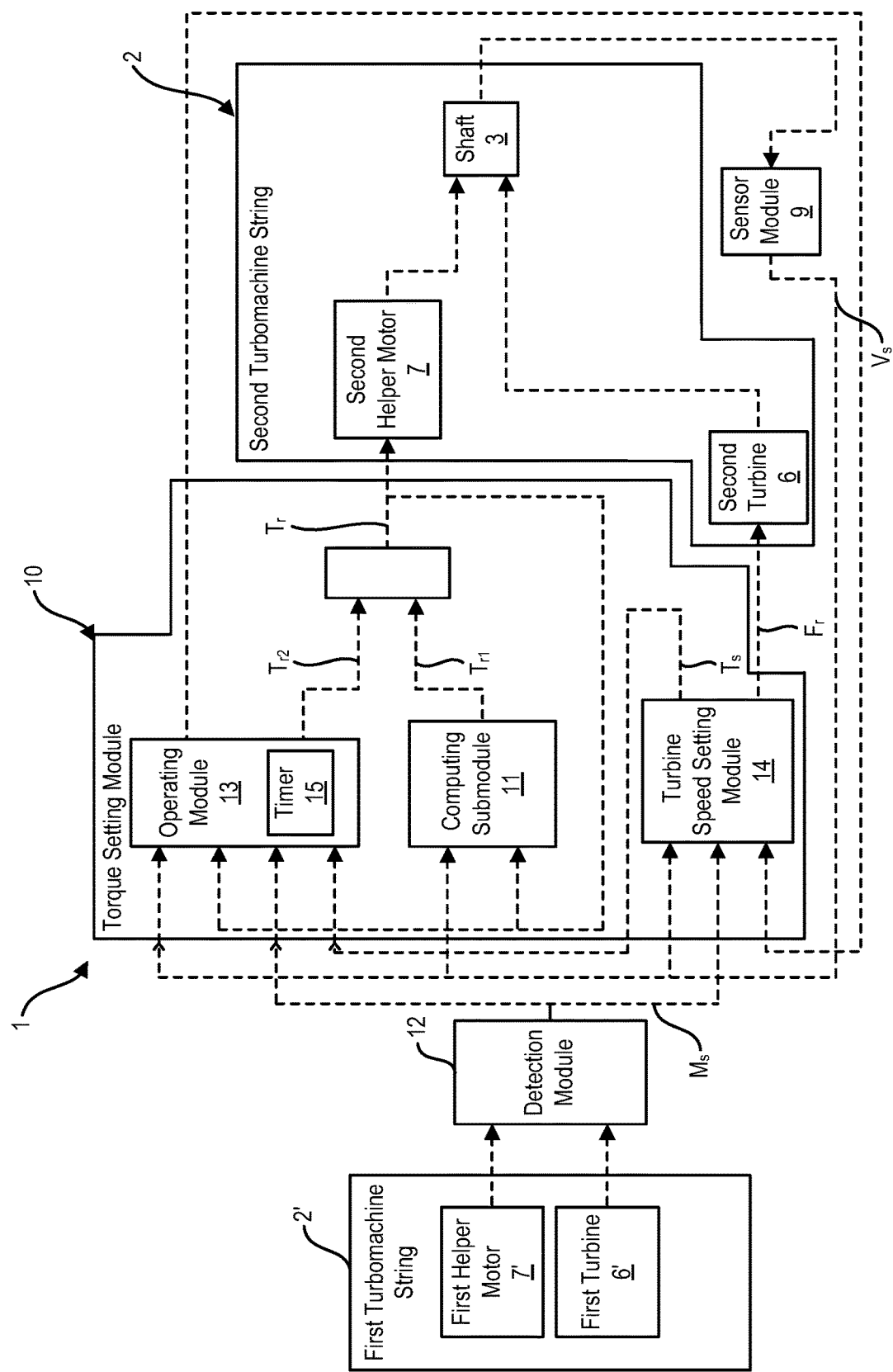
FIG. 1 is a schematic representation of the functioning of a control unit for a motor driver of a turbomachine string according to an embodiment of the present invention.

The following description of exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

With reference to the attached drawings, with the number 1 is indicated a control unit for a motor driver of a turbomachine string.

The turbomachine string will also be described briefly in this disclosure for ease of reference, and it will be indicated with reference number 2.

Indeed, the turbomachine string 2 comprises a shaft 3. A plurality of compressors 4 are attached to the shaft, so that they can compress each a different fluid. The vapor coming from chillers and/or cold box units is separated in the suction drum (usually provided at the inlet of each compressor stage) in order to separate vapor from liquid entrainment before feeding the compressor stage. The vapor outgoing from compressors 4 is routed to coolers and/or condensers section before entering in the next compressor stage or feed accumulator or chillers and/or cold box units.

The turbomachine string 2 also comprises a motor driver 6, 7 connected to the shaft 3. The motor driver itself may comprise a turbine 6, attached onto the shaft 3. The turbine 6 is the primary power source of the string 2. The motor driver 6, 7 may comprise an helper motor 7, which is in an embodiment an electric motor. The helper motor 7 is also connected to the shaft 3. Please note that in the embodiment of the invention shown in the figures, the motor driver 6, 7 comprises both the helper motor 7 and the turbine 6.

However, in further embodiments, not shown in the drawings, the motor driver may comprise either one of the helper motor 7 or the turbine 6.

Figure 2:
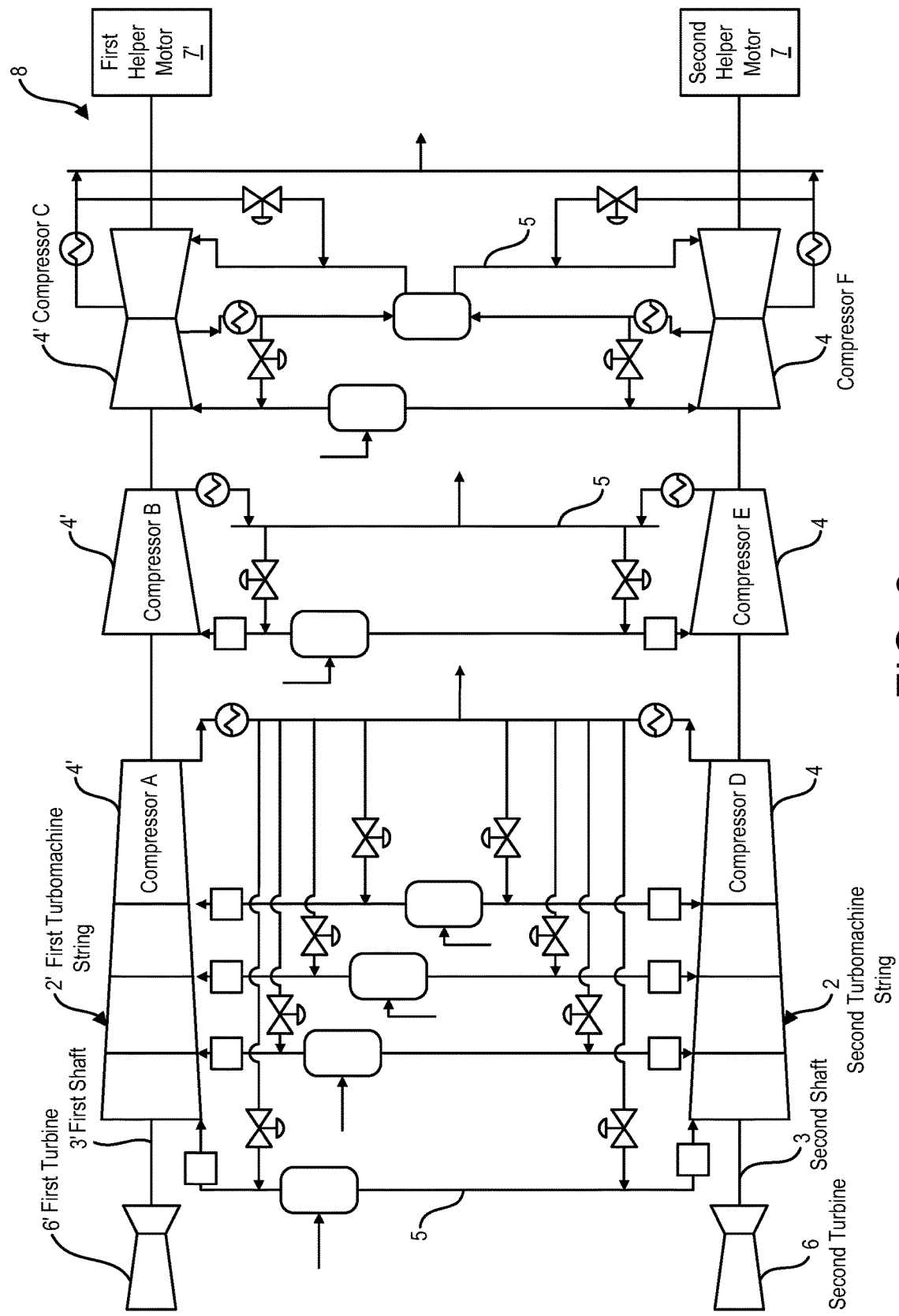
FIG. 2 is a schematic representation of a liquefaction plant of a gaseous product.

As shown in the schematic FIG. 2, a plant 8 may comprise more than one string 2. In this example, the plant 8 comprises two turbomachine strings 2, 2'. In particular, the turbomachine strings 2, 2' are considered identical for the purpose of the present disclosure. However, in further embodiments not shown in the drawings, the two turbomachine strings 2, 2' may comprise different components. Also, in further embodiments not shown in the drawings, there can be any number of turbomachine strings 2.

Accordingly, the control unit 1 will be described in detail. Indeed, the control unit 1 will be described by subdividing it into a plurality of modules. Such subdivision is done for ease of description only, and in no way should be considered as reflecting the physical structure of the control unit 1 itself. Rather, each module can be implemented as an electronic circuit on a suitable hardware support, as a software routine, subroutine or library or as both. Each module may reside on a local unit or may be distributed over a network. Also, the modules can communicate with each other either via a suitable wired or wireless protocol.

With particular reference to FIG. 1, the control unit 1 comprises a sensor module 9, which is configured to detect the speed of the shaft 3 of the turbomachine string 2 on which it is installed. Indeed, the sensor module 9 is configured to emit a speed signal Vs representing a value of the speed of the shaft 3. The sensor module 9 is by itself known to the person skilled in the art, and will therefore not be further described.

The control unit 1 also comprises a torque setting module 10, which is configured to set a torque of the motor driver 6, 7. The torque setting module 10 is operatively connected to the sensor module 9, and is configured to acquire the above mentioned speed signal Vs.

Moreover, the torque setting module 10 is configured to emit a torque request signal Tr that is sent to the helper motor 7.

Specifically, the torque setting module 10 comprises a computing submodule 11 configured to compute a driving torque request value of the helper motor 7 as a function of the current rotation speed of the shaft 3 of the turbomachine string 2 and of the current driving torque request value. Indeed, during normal operating conditions, the torque request signal Tr is computed by the torque setting module 10. The torque request signal Tr is selected as the maximum between a first torque request signal Tr1, which is the normal torque request during standard operating condition, and a second torque request signal Tr2 which handles the torque request to the motor driver 6, 7 under trip conditions. The first torque request signal Tr1 is computed by the computing submodule 11, on the basis of the torque request signal Tr itself and of the speed signal Vs. The computation of the second torque request signal Tr2 will be explained in a following part of the present disclosure.

The control unit 1 also comprises a detection module 12, which is configured to detect the shutdown of another turbomachine string 2'. In particular, it may detect the malfunction of either the helper motor 7' or of the turbine 6' before their malfunction has a significant impact on the speed of the shaft 3'. On the malfunction of the other string 2', the detection module 12 is configured to emit a malfunction signal Ms, which enables the response of the control unit 1 to the unplanned shutdown.

Indeed, the torque setting module 10 acquires the malfunction signal Ms, which enable the logic capable of handling this condition. Indeed, the torque setting module 10 comprises an operating module 13, operatively connected to the detection module 12. The operating module 13 is configured to set a driving torque request value of the helper motor 7 during the shutdown of the other turbomachine string 2'. In particular, the operating module performs this operation by computing the second torque request signal Tr2. As explained above, the torque request signal Tr is selected as the higher torque request between the torque setting module 10 first torque request signal Tr1 and the operating module 13 second torque request signal Tr2. Therefore, under operating condition, the first torque request signal Tr1 from the torque setting module is selected. Under emergency conditions, since the operating module 13 needs to drive shaft 3 to a higher speed in order to handle a higher load, the signal second torque request Tr2 is selected, since it is higher than the signal first torque request Tr1.

In other words, when the detection module 12 signals the shutdown of another turbomachine string 2', the driving torque request value is higher than a preset driving torque request during a stationary operating condition. In particular, this driving torque increase is performed immediately on detecting the shutdown of the other turbomachine string 2'. In other words, the control unit 1 does not simply react to the dynamics of the turbomachine string 2, which would also increase the torque on the shaft 3 but, anticipating the higher load, it begins increasing the torque before the higher load actually happens.

Additionally, the torque setting module 10 also comprises a turbine speed setting module 14, which is configured to compute a target rotation speed of the turbine 6 by ramping the current rotational speed to the maximum value (MCS). Specifically, the turbine speed setting module 14 acquires the speed signal Vs and the malfunction signal Ms. The turbine speed setting module emits a fuel request signal Fr to regulate the fuel flow to the turbine 6. At the same time of the helper motor 7 action, if needed, the turbine speed setting module 14 also increases the target rotation speed of the turbine 6 on the detection of a shutdown by the detection module 12. The rotation of the turbine 6 can be increased as needed, up until the maximum continuous speed.

Also, it is to be noted that the operating module 13 is configured to compute the driving torque request value of the helper motor 7 also as a function of a target rotation speed of the turbine 6. Specifically, the turbine speed setting module 14 emits a turbine setpoint signal Ts that is acquired by the torque setting module 10, specifically by the operating module 13.

The function of the control unit 1 is as follows: on detection of the shutdown of a first turbomachine string 2', the driving torque on the shaft 3 of the second turbomachine string 2 is increased. In particular, the driving torque increase is obtained through setting a driving torque request value of the motor driver 6, 7 of the second turbomachine string 2 during the shutdown of the first turbomachine string 2'. With more detail, the detection of the malfunction by the detection module 12 enables the operating module 13, part of the torque setting module 10, which handles the malfunction condition on the side of the still operating turbomachine string 2. This torque request value, carried by the second torque request signal Tr2 of the operating module 13, is selected as being higher than a preset driving torque request during a stationary operating condition.

It is to be noted that the driving torque increase is performed immediately on detecting the shutdown of the first turbomachine string 2'.

The driving torque request value of the helper motor 7 is obtained as a function of the current rotation speed of the shaft 3 of the second turbomachine string 2 and of the current driving torque request value. Optionally, a target rotation speed of the turbine 6 is obtained by ramping the current rotational speed to the maximum value (MC S). The driving torque request value of the helper motor 7 is obtained also as a function of the target rotation speed of the turbine 6.

During the transient, if the still operating string 2 reaches the Maximum Continuous Speed (MCS), the control unit 1 will switch to regulation mode for maintaining the MCS.

If, on the other hand, the string 2 does not reach the Maximum Continuous Speed (MCS) and if the propane and MR vapor flow from the liquefaction process increase too much during the acceleration of the string 2, the motor driver 7 torque may reach the maximum capability without reaching the MCS. Once the liquefaction process transient is finished, the speed of the string 2 will be further increased up to the MCS, since by then the compressors 4 will have absorbed the torque decrease. The control unit 1 will then switch to regulation mode for maintaining the MCS.

It is to be noted that the operation of the control unit 1 can be regulated either automatically, in which case a timer 15 deactivates the control unit 1 after a preset time interval from when the malfunction of the other turbomachine string 2' was first detected. Alternatively or additionally, the control unit 1 can be deactivated by a manual switch (not shown). Additionally, it is possible for the operator to enable and/or disable the operating module 13 of the torque setting module 10. Similarly, it is possible for the operator to enable and/or disable the trip prevention logic of the turbine speed setting module 14.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A method for handling a shutdown of a turbomachine string, the turbomachine string being installed in a plant for a liquefaction process of a gaseous product, the plant comprising a first turbomachine string and a second turbomachine string, the method comprising the steps of:
   detecting a shutdown of the first turbomachine string caused by a shutdown event associated with the first turbomachine string, the first turbomachine string including at least one first motor driver and at least one first driven compressor;
   increasing a driving torque on a shaft of the second turbomachine string when the shutdown is detected, the second turbomachine string including at least one second motor driver and at least one second driven compressor; and
   maintaining the driving torque increase on the shaft of the second turbomachine string so that a speed of the at least one second motor driver is increased from a current speed to a preset speed for a predetermined period of time from when the shutdown was detected,
   wherein the driving torque increase is obtained through setting a driving torque request value of the at least one second motor driver of the second turbomachine string during the shutdown event associated with the first turbomachine string, said driving torque request value being higher than a preset driving torque request of the at least one second motor driver during a normal operating condition, and
   wherein the driving torque increase occurs before an anticipated higher load acts on the second turbomachine string and is not simply a reaction to dynamics of the second turbomachine string.

2. The method according to claim 1, wherein the at least one first motor driver and/or the at least one second motor driver is a turbine, a helper motor, or an electric helper motor.

3. The method according to claim 1, wherein the preset speed is a maximum operating speed of the at least one second motor driver.

4. The method according to claim 1, further comprising the step of maintaining the preset speed for the predetermined period of time or until the shutdown event associated with the first turbomachine string is ended.

5. The method according to claim 1, further comprising the step of maintaining said driving torque increase until the shutdown event associated with the first turbomachine string is ended.

6. The method according to claim 1, wherein the driving torque request value of the at least one second motor driver is obtained as a function of the current rotation speed of the shaft of the second turbomachine string and of a current driving torque request value.

7. The method according to claim 1, wherein the driving torque request value of the at least one second motor driver is obtained as a function of a target rotation speed of a turbine attached to the shaft of the second turbomachine string.

8. The method according to claim 7, wherein the target rotation speed of the turbine is obtained as a function of the current rotation speed of the shaft.

9. A control unit for a motor driver of a turbomachine string, the control unit comprising:
   a sensor module configured to detect a speed of a shaft of a first turbomachine string including a first motor driver;
   a torque setting module configured for setting a torque of the first motor driver; and
   a detection module operatively connected to the torque setting module, the detection module configured to detect a shutdown of a second turbomachine string,
   wherein the torque setting module is configured to promptly increase a driving torque on the shaft of the first turbomachine string when the shutdown is detected and to maintain the driving torque increase on the shaft of the first turbomachine string so that a speed of the first motor driver is increased following detection of the shutdown from a current speed to a preset speed for a predetermined period of time from when the shutdown was detected,
   wherein the torque setting module comprises an operating module configured to set a driving torque request value of a helper motor of the first turbomachine string during the shutdown of the second turbomachine string, the driving torque request value being higher than a preset driving torque request of the helper motor during a stationary operating condition, and wherein the driving torque increase occurs before an anticipated higher load acts on the second turbomachine string and is not simply a reaction to dynamics of the second turbomachine string.

10. The control unit according to claim 9, wherein the torque setting module comprises an operating module configured to compute a driving torque request value of the helper motor as a function of a current rotation speed of the shaft of the second turbomachine string and of the current driving torque request value.

11. The control unit according to claim 10, wherein the operating module is configured to compute the driving torque request value of the first motor driver as a function of a target rotation speed of a turbine attached to the shaft of the second turbomachine string.

12. The control unit according to claim 11, wherein the torque setting module comprises a turbine speed setting module configured to compute the target rotation speed of the turbine as a function of a current rotation speed of the shaft.

13. A turbomachine string comprising the control unit according to claim 9.

* * * * *